United States Patent [19]

Jakobs

[11] Patent Number: 4,664,250
[45] Date of Patent: May 12, 1987

[54] SCRAPER DEVICE FOR CONVEYOR BELTS

[76] Inventor: Hartmut Jakobs, Eifelstrasse 47, 4350 Recklinghausen, Fed. Rep. of Germany

[21] Appl. No.: 713,504

[22] Filed: Mar. 19, 1985

[30] Foreign Application Priority Data

Mar. 19, 1984 [DE] Fed. Rep. of Germany ....... 3410046

[51] Int. Cl.⁴ ............................................ B65G 45/00
[52] U.S. Cl. .................................................. 198/499
[58] Field of Search ................ 198/499, 497; 15/256.5

[56] References Cited

U.S. PATENT DOCUMENTS 3,674,131 7/1972 Matson ............................ 198/497 X
4,359,150 11/1982 Bowman et al. ................ 198/499 X

FOREIGN PATENT DOCUMENTS 8227795 1/1983 Fed. Rep. of Germany .
0002111 1/1983 Japan .................................... 198/499
1336121 11/1973 United Kingdom ................ 198/499
1553210 9/1979 United Kingdom ................ 198/499

Primary Examiner—Robert J. Spar
Assistant Examiner—Lyle Kimms
Attorney, Agent, or Firm—Martin A. Farber

[57] ABSTRACT

A scraper device for conveyor belts, having a scraper which extends in the direction of the width of the conveyor belt and is seated on arms which extend in the longitudinal direction of the conveyor belt and are adjustable with respect to the bottom of the conveyor belt, each arm being formed by a package of leaf springs of different length, arranged in the form of fish scales one above the other, the longest of which leaf springs, which faces the conveyor belt, bearing at its end region the holding bracket for the scraper and extending, together with the remaining leaf springs, from a support (20) which is swung by rotation of a shaft (22). In order to obtain a rapid adjustment of the application pressure, a spring (31) which urges the support (20) in the application direction of swing is arranged between the shaft (22) which is provided with a graduated-scale (38) and the support (20) which is turnable relative to the shaft (22).

13 Claims, 5 Drawing Figures

SCRAPER DEVICE FOR CONVEYOR BELTS

FIELD AND BACKGROUND OF THE INVENTION

The present invention relates to a scraper device for conveyer belts in general.

In particular the invention relates to a scraper device for conveyor belts having a scraper which extends in the direction of the width of the conveyor belt and is seated on arms which extend in the longitudinal direction of the conveyor belt, said arms being adjustable with respect to the bottom of the conveyor belt and each arm being formed of a pack of leaf springs of different lengths which lie in fish scale-like manner, one above the other, the longest leaf spring, which faces the conveyor belt, bearing the holding bracket for the scraper in the region of its end and extending together with the remaining leaf springs from a support which is swung by the turning of a shaft.

One such scraper device is known from Federal Republic of Germany Utility Model No. 8,227,795. The adjustment of the application pressure of the scraper lip against the conveyor belt is effected by an adjustment nut which travels on an adjustment spindle and upon the adjustment of which the shaft is positively swung together with the support. The application pressure is, in that case, determined empirically.

SUMMARY OF THE INVENTION

The object of the invention is to develop a scraper device of the aforementioned type in simple fashion in such a manner that it is more advantageous in use in that the application pressure of the scraper can be adjusted rapidly.

This object is achieved in the manner that a spring which urges the support in the application direction of swing is arranged between the shaft, which may be provided with a scale plate, and the support, which is turnable relative to the shaft.

As a result of this development, there is obtained a scraper device of this type which is of increased utility in use. The scraper can be set in simple and precise fashion to the pressure of application against the conveyor belt which is required in each case. For this purpose, only the initial tension of the spring, present between shaft and support, need be changed. This is done by turning the shaft via the adjustment nut and adjustment spindle. Simultaneously with the rotation of the shaft, relative displacement takes place between the shaft and support as a result of the varying initial tension of the spring which serves as a measurement spring. The scale plate which may be attached to the shaft cooperates with an index point on the support and indicates the instantaneous pressure of application of the scraper against the conveyor belt. The maximum force of this spring is greater than the maximum pressure of application of the scraper against the conveyor, so that precise adjustment is possible over the measurement range. Another advantage is that this spring represents a certain spring coupling between the support and shaft, as a result of which the adaptability of the scraper device to different conveyor-belt designs is increased. Different springs can be employed. For example, it is possible to use compression springs which are arranged between wings on the shaft and support. However, it is also possible to use a coiled leaf spring between shaft and support, the initial tension of the spring being changed by turning these two parts with respect to each other.

One advantageous further embodiment consists in developing the support as a bushing which is arranged concentric to the shaft and within the two end walls of which there are mounting holes for the shaft while a bracket for the attachment of the ends of the leaf springs extends tangentially from the cylindrical surface of the bushing. This results in a very compact construction. The inside of the bushing serves to accommodate the spring, and a spirally wound release spring as mentioned above can be favorably placed therein. The mounting of the package of leaf springs can also be effected very simply. It is merely necessary to screw its ends to the bracket in per se customary manner.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
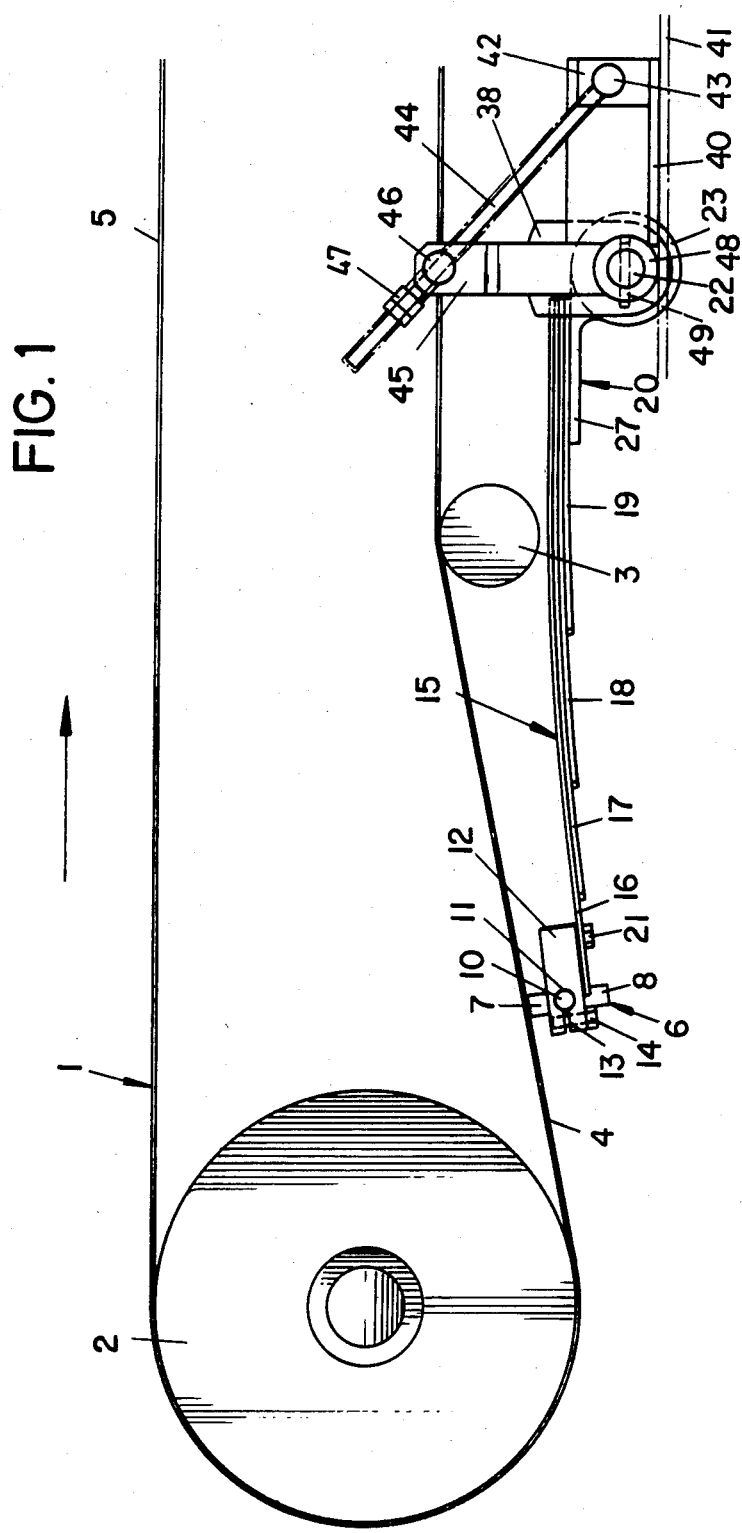
FIG. 1 is a side view of a scraper device associated with a conveyor belt.
Figure 2:
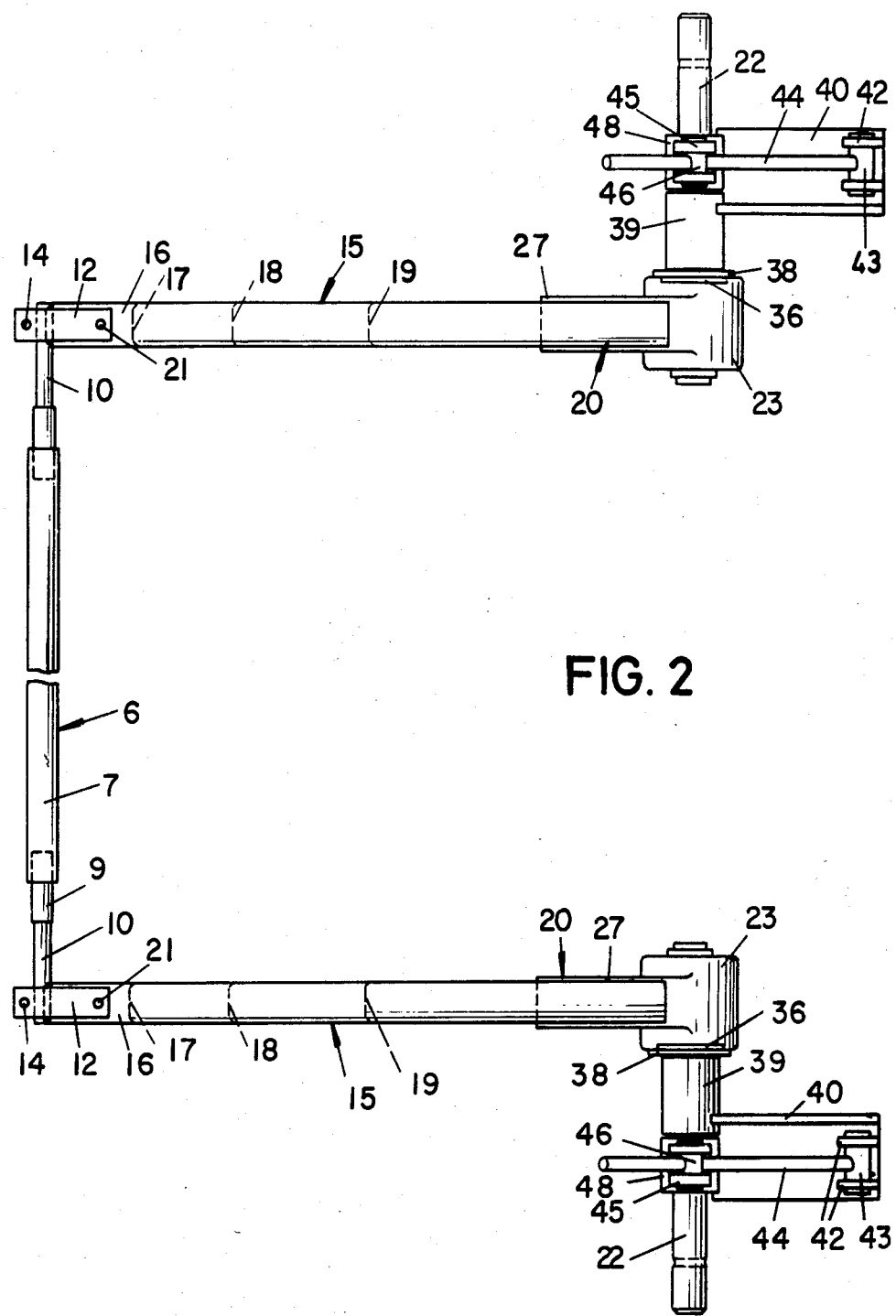
FIG. 2 is a top view of the scraper device, the conveyor belt being omitted.
Figure 3:
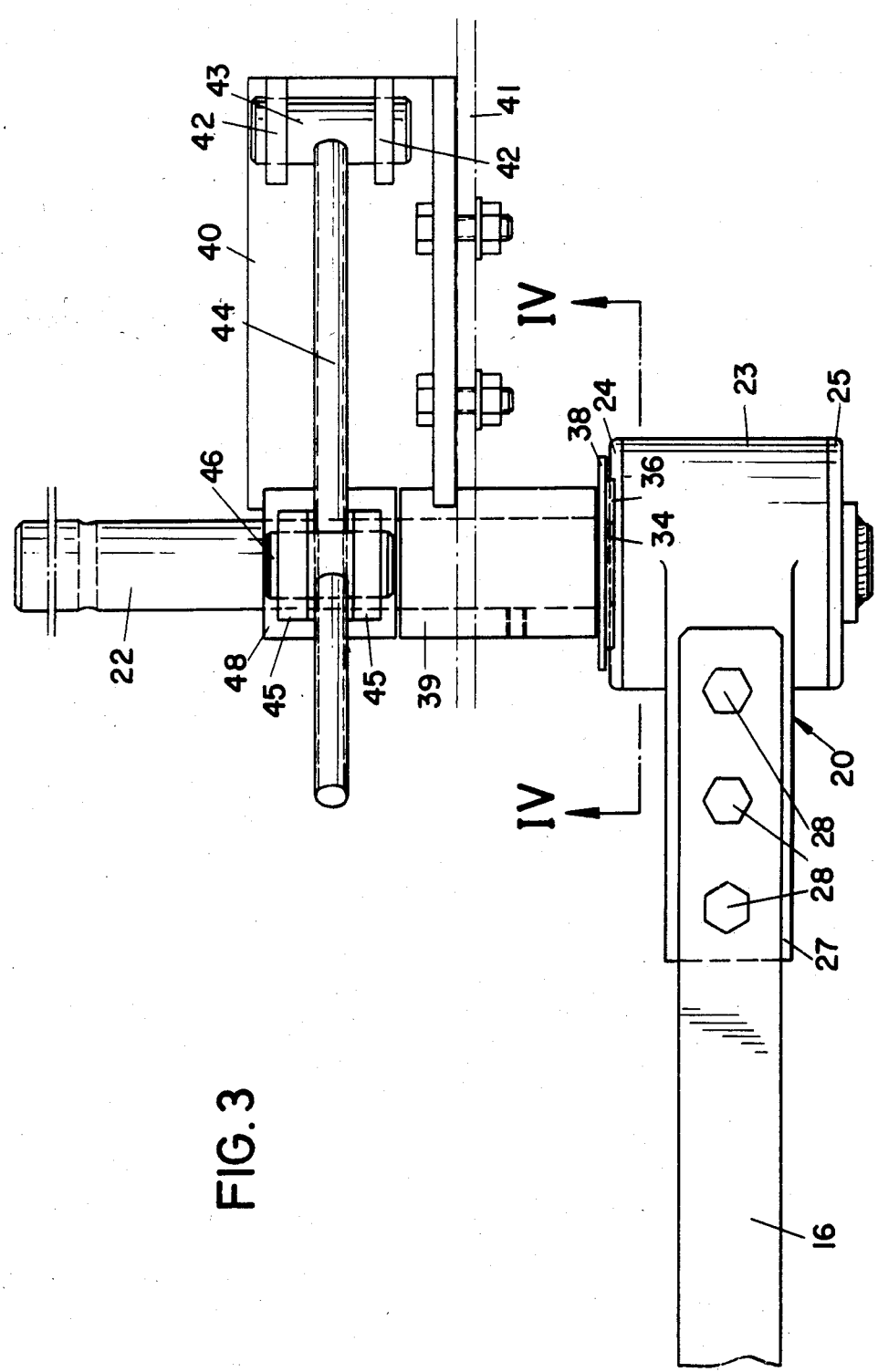
FIG. 3 shows a detail of the scraper device in top view, in the region of a bushing which contains the spring (not shown).
Figure 5:
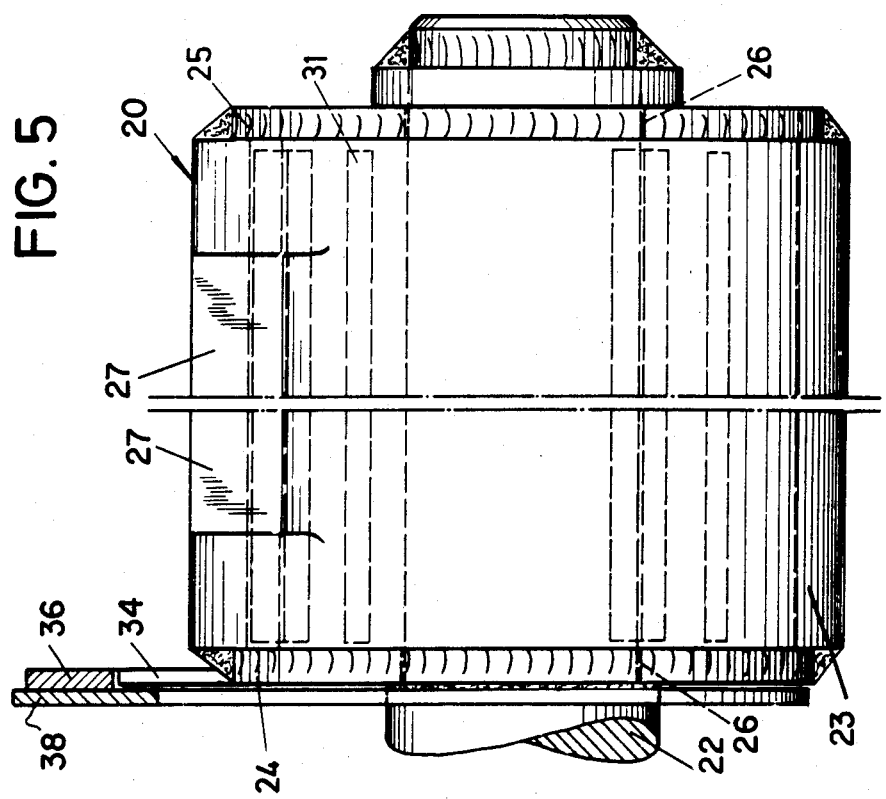
FIG. 5 is a side view of FIG. 4, shown partially in section.

A conveyor belt 1, which consists generally of elastic material, wraps around a guide roller 2. Parallel to the latter, there is a tensioning roller 3 so that the section 4 of the conveyor belt adjount the guide roller 2 moves upward in the direction towards the upper conveyor-belt section 5.

In the region between the guide roller 2 and the tensioning roller 3, a scraper 6 acts against the bottom of the section 4 of the conveyor belt. This scraper is developed as a turnable scraper and has two scraper lips 7, 8, lying in a common plane and extending from a central square tube 9. The scraper lips 7, 8 extend over the width of the conveyor belt 1 and preferably consist of rubber. In the embodiment shown, the scraper strip 7 is being used. Its purpose is to clean the surface of the conveyor belt which receives the material to be transported. At its end the square tube 9 is extended by stub shafts 10 of circular cross section which enter into boreholes 11 in holding brackets 12. A transverse slot 13 extending from the outer end edge of the holding bracket 12 opens into the borehole 11, and a tensioning screw 14 extends through the bracket 12 transverse to said slot. By means of said screw it is possible to clamp the stub shaft 10 fast. Accordingly, the required angle of adjustment of the scraper lips 7 and 8 with respect to the section 4 of the conveyor belt can be adjusted.

Each holding bracket 12 is carried by an arm 15 which is formed of a package of leaf springs 16, 17, 18 and 19 of different lengths, arranged in a fish-scale-like manner one above the other. The end region of the longest leaf spring 16, which faces the conveyor belt 1, bears the holding bracket 12. A screw 21 serves for the attachment of the bracket. This longest leaf spring 16 extends, together with the remaining leaf springs 17, 18, 19, from a support 20. The support 20 is specifically developed as a bushing 23 which is concentric to a shaft 22. Aligned bearing holes 26 for the shaft 22 are present in the end walls 24, 25 of said bushing. A bracket 27 extends tangentially from the cylindrical surface of the bushing 23 for the attachment of the ends of the leaf springs by means of screws 28. The bushing 23, which is turnable with respect to the shaft 22, forms a radial shoulder 29 on its inner wall. The bent end 30 of a spirally wound spring 31, which is traversed by the shaft 22, rests against the shoulder. The other end 32 of the leaf spring 31 is also bent and rests against a radial step 33 on the shaft 22. This spring 31 is under initial tension and urges the support 20 in the swing direction of application, the scraper 6 coming against the section 4 of the conveyor belt.

An indicator segment 34 having an index line 35 extends radially from the bushing 23. Concentrically to the indicator segment 34, there is a graduated-scale segment 36. The latter contains a scale 37 which cooperates with the index line 35. The scale segment 36 is seated on a scale plate 38 which is traversed by the shaft 22 and is firmly connected to said shaft. Relative movement between shaft 22 and support 20 or bushing 23 leads to a displacement of the index line 35 with respect to the scale 37 and indicates the initial tension of the spring 31.

The section of the shaft 22 which adjoins the bushing 23 passes through a bearing 39. For the mounting of the latter, there is provided a bracket 40 of angular cross section which is bolted to the frame 41 of the conveyor belt, shown in dash-dot line. The bracket 40 receives a double-stay support bracket 42 which turnably mounted a transverse pin 43. A displacement spindle 44 extends radially from the transverse pin 43 and passes through a transverse pin 46, mounted on the free end of a displacement lever 45. An adjustment nut 47 runs on the threaded adjustment spindle 44. The displacement lever 45 is seated via a bushing 48 on the shaft 22. A transverse pin 49 connects the bushing 48 to the shaft 22, forming a single unit. As can be noted from FIG. 1, the transverse pins 43, 46 and the shaft 22 form the corners of a triangle in such a manner that the side of the triangle representing the displacement spindle 44 is of variable length.

Figure 4:
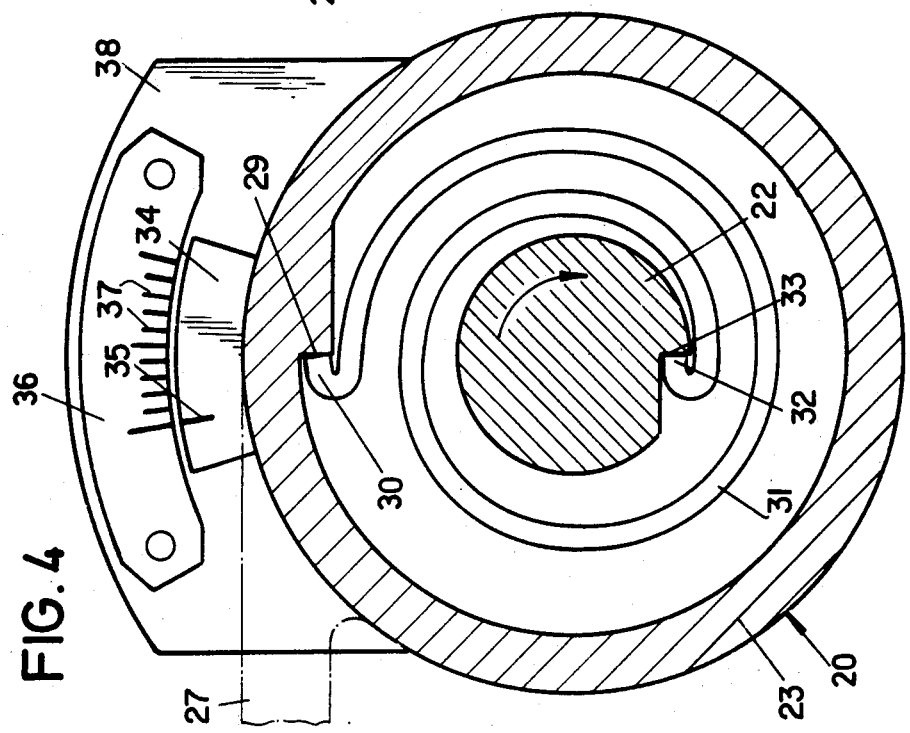
FIG. 4 is a section along the line IV—IV of FIG. 3.

Since the scraper 6 is supported at its ends by separate arms 15 and each arm 15 extends from a support 20, both displacement spindles 44 are to be changed in their supporting length by the adjustment nuts 47 in the event of a change of the application pressure of the corresponding scraper lip. The shaft 22, in this event, is turned positively by the displacement lever 45. If the shaft 22 turns, as shown in FIG. 4, in the direction of the arrow indicated in the figure, then the initial tension of the spring 31, which urges the bushing 23 and respectively the support 20 in the direction of swing for application is increased. Upon the relative movement which takes plate in this case between the shaft 22 and the support 20, the index line 35 moves with respect to scale 37 and accurately indicates the instantaneous application pressure. In this way, the desired application pressure of the scraper can be easily adjusted on both sides of the conveyor belt, without tedious empirical determinations.

I claim:

1. In a scraper device for a conveyor belt, having a scraper which extends in a direction of the width of the conveyor belt and is seated on arms which extend in the longitudinal direction of the conveyor belt and are adjustable with respect to a bottom of the conveyor belt, each arm comprising a package of leaf springs of different lengths arranged overlappingly, a longest of said leaf springs which faces the conveyor belt having at its end region a holding bracket for the scraper and extending, together with the remaining of said leaf springs, from a support, said support being swingable by turning of a shaft, and means to adjustably turn said shaft for swinging said support, the improvement wherein said support is rotatably mounted on said shaft,
spring means for biasing said support in a direction of swing toward applying said scraper against said conveyor belt, and
said spring means is arranged between said shaft and said support, said support surrounding said spring means 2. The scraper device according to claim 1, wherein said spring means is a coiled leaf spring.
3. The scraper device according to claim 1, wherein said spring means is a compression spring.
4. The scraper device according to claim 3, wherein said shaft and said support are formed with wings against which said spring means engages.
5. The scraper device according to claim 1, wherein said spring means is a separate member from said leaf springs.
6. The scraper device according to claim 1, wherein said means to adjustably turn said shaft comprises
means for adjusting the force of said spring means against said support by turning said shaft relative to said support.
7. The scraper device according to claim 6, wherein said support includes a first bushing concentric to said shaft,
a frame of said conveyer belt,
said adjusting means comprises,
a bearing adjacent said bushing,
a second bushing, said shaft extends through said bearing and said second bushing,
said second bushing is connected for joint rotation with said shaft,
a bracket extends from said bearing and is secured to said frame,
a threaded adjustment spindle is pivotally mounted on said bracket,
a displacement lever is connected to said second bushing,
an adjustment nut is threaded on said spindle, and
a pivot pin, through which said spindle extends, is mounted on said displacement lever.
8. The scraper device according to claim 1, comprises
two of said supports, two of said arms, two of said shafts and two of said spring means on opposite sides of said conveyor belt, and
two of said means to adjustably turn said shaft comprise separate means for adjusting the force of each said spring means against each said support by turning each said shaft relative to each said support.
9. The scraper device according to claim 1, wherein said spring means is a spiral spring.
10. The scraper device according to claim 1, further comprising a graduated-scale provided on one of said support and shaft, and an indicator provided on the other of said support and shaft.

11. The scraper device according to claim 10, wherein said graduated-scale is provided on said shaft.

12. The scraper device according to claim 11, wherein said support comprises a bushing concentric to said shaft and having two end walls formed with bearing mounting holes, said shaft extends through said bearing mounting holes, and bracket means for attaching thereto ends of said leaf springs, said bracket means extends tangentially from a cylindrical surface of said bushing.

13. The scraper device according to claim 10, wherein said indicator is an index line cooperating with said graduated-scale.

* * * * *